(12) United States Patent
Heeg et al.

(10) Patent No.: US 8,708,413 B2
(45) Date of Patent: Apr. 29, 2014

(54) LOCKING DEVICE FOR A VEHICLE SEAT

(75) Inventors: Norbert Heeg, Dahn (DE); Andreas Diehl, Otterberg (DE); Markus Dein, Weil der Stadt (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 487 days.

(21) Appl. No.: 13/120,264

(22) PCT Filed: Sep. 23, 2009

(86) PCT No.: PCT/EP2009/006859
§ 371 (c)(1),
(2), (4) Date: Mar. 22, 2011

(87) PCT Pub. No.: WO2010/034474
PCT Pub. Date: Apr. 1, 2010

(65) Prior Publication Data
US 2011/0169315 A1  Jul. 14, 2011

(30) Foreign Application Priority Data

Sep. 23, 2008  (DE) .................. 10 2008 048 411
Nov. 29, 2008  (DE) .................. 20 2008 016 018 U

(51) Int. Cl.
*B60N 2/20* (2006.01)
(52) U.S. Cl.
USPC ................. 297/378.13; 296/65.05; 296/65.16
(58) Field of Classification Search
USPC ................. 297/378.13; 296/65.05, 65.16
See application file for complete search history.

(56) References Cited

U.S. PATENT DOCUMENTS

| 6,902,237 | B2 | 6/2005 | Petry |
| 7,063,368 | B2 * | 6/2006 | Kayumi ............. 296/65.05 X |
| 7,753,428 | B2 | 7/2010 | Kato et al. |
| 2008/0093875 | A1 | 4/2008 | Hatta et al. |

FOREIGN PATENT DOCUMENTS

| DE | 102004030282 A1 | 1/2006 |
| DE | 102004056086 B3 | 1/2006 |
| DE | 102005057623 B3 | 5/2007 |
| EP | 1787857 A2 | 5/2007 |
| JP | 2004-249964 A | 9/2004 |
| JP | 2005-14843 A | 1/2005 |
| JP | 2005-509555 A | 4/2005 |
| WO | 2006-123981 A1 | 11/2006 |
| WO | 2007/123128 A1 | 11/2007 |

* cited by examiner

*Primary Examiner* — Antho D Barfield
(74) *Attorney, Agent, or Firm* — McGlew and Tuttle, P.C.

(57) ABSTRACT

A locking device (1) for a vehicle seat, particularly for a motor vehicle seat, has a housing (5), a catch (11) mounted in a movable manner on the housing (5) for locking with a mating element (B). At least one safety element (25, 31) is provided for securing the catch (11) in the locked state and can be moved relative to the catch (11) for unlocking the locking device (1). A query device (40) queries the locking state of the locking device (1) and has at least one transducer (41, 42) and at least one sensor (43). The query device (40) is designed in a contactless manner. The transducer (41, 42) and the sensor (43) interact with each other due to the relative positioning and/or movement thereof.

17 Claims, 5 Drawing Sheets

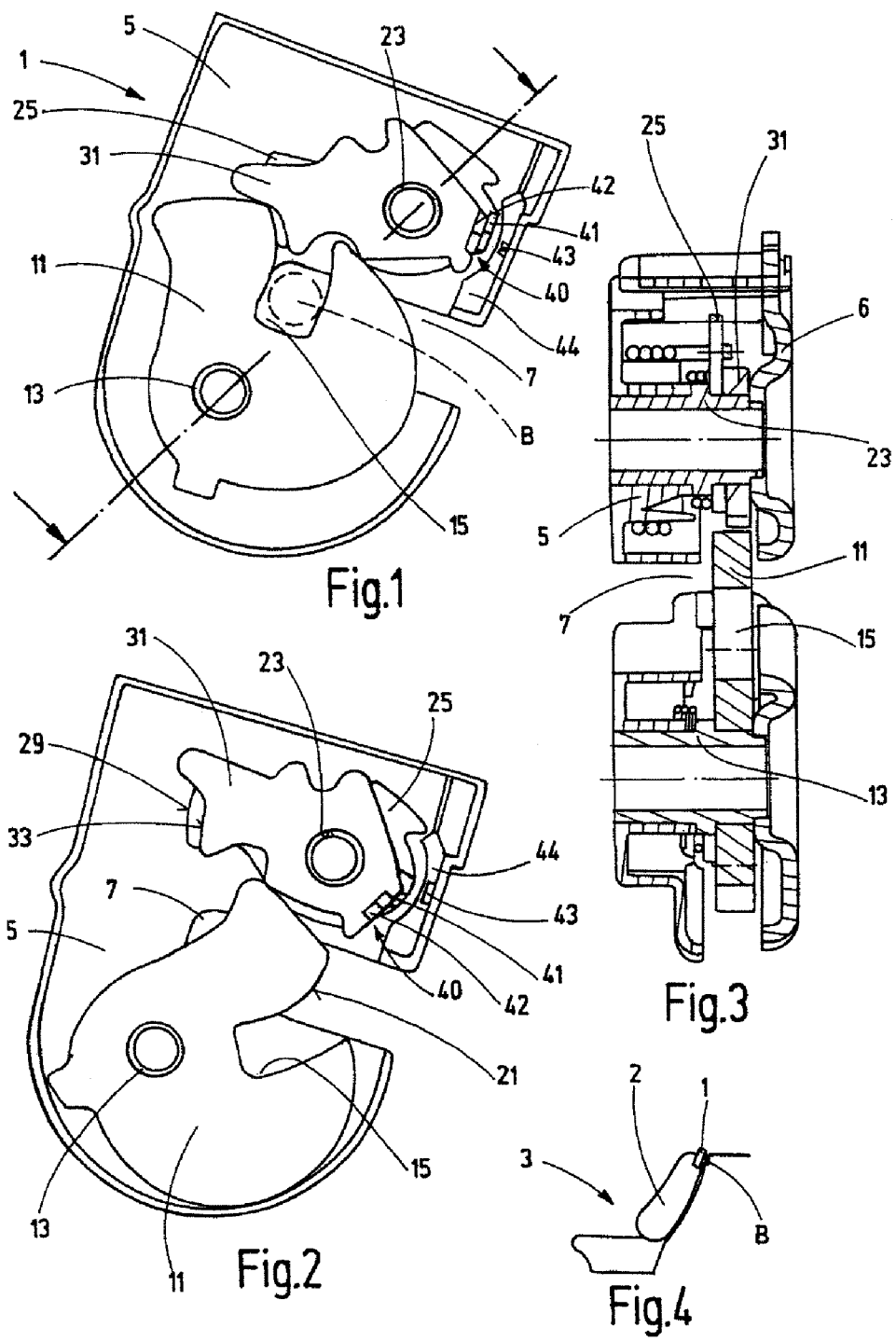

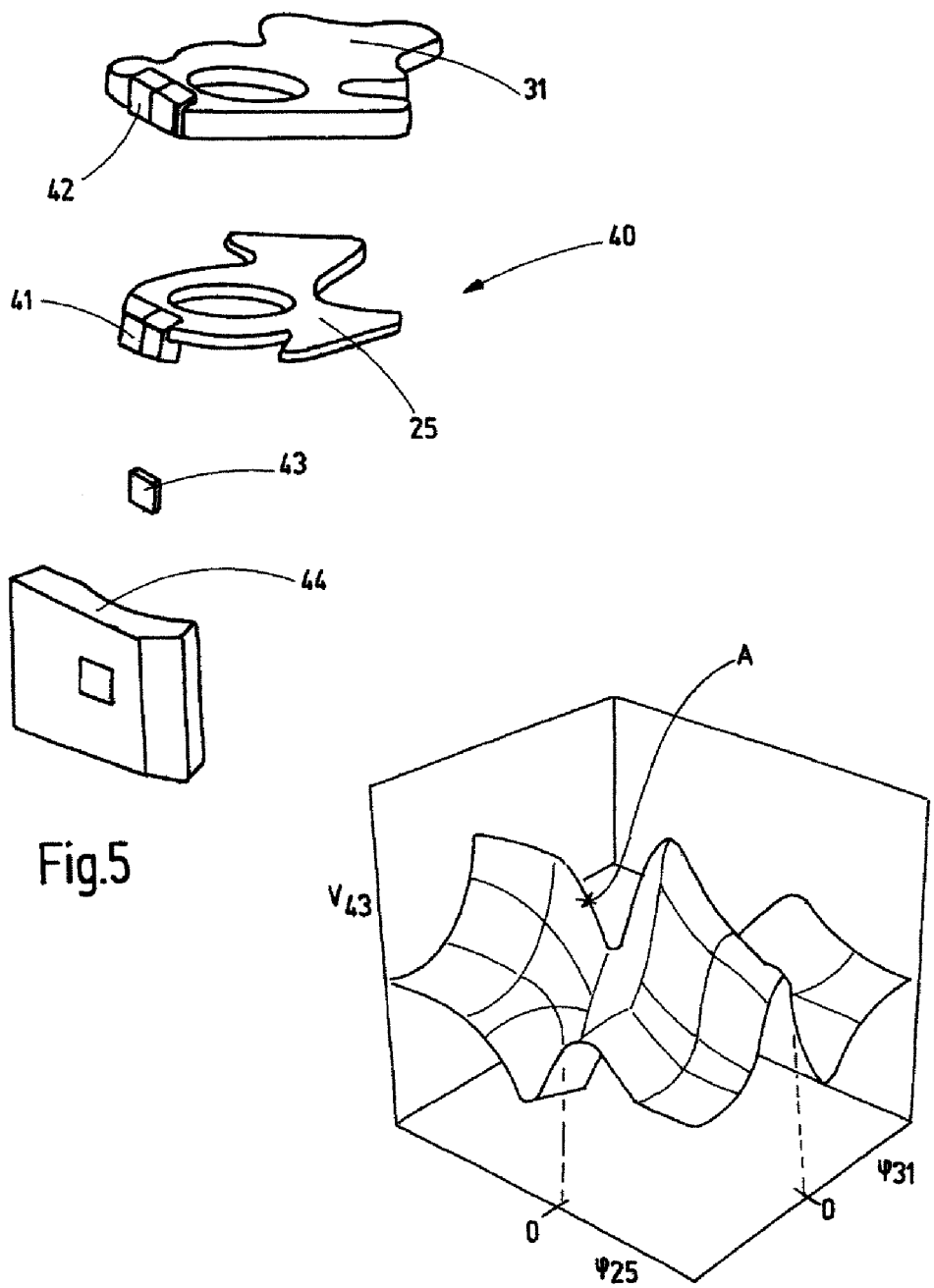

LOCKING DEVICE FOR A VEHICLE SEAT

CROSS REFERENCE TO RELATED APPLICATIONS

This application is a United States National Phase application of International Application PCT/EP2009/006859 and claims the benefit of priority under 35 U.S.C. §119 of German Patent Application DE 10 2008 048 411.3 filed Sep. 23, 2008 and German Patent Application 10 2008 016 018.9 filed Nov. 29, 2008, the entire contents of each of which are incorporated herein by reference.

FIELD OF THE INVENTION

The invention relates to a locking device for a vehicle seat, in particular for a motor vehicle seat, the locking device having a housing, a pawl mounted in a movable manner on the housing for locking with a mating element, at least one safety element which is provided for securing the pawl in the locked state, and can be moved relative to the pawl for unlocking the locking device and a query device which queries the locked state of the locking device and has at least one transducer and at least one sensor.

BACKGROUND OF THE INVENTION

A locking device of this type comprising two safety elements and an electrical query device is disclosed in DE 10 2004 056 086 B3. A spring which may come to bear against one of the safety elements serves as a transducer for a microswitch.

US 2008/093875 A1 discloses a locking device for a vehicle seat having a housing, a pawl mounted in a movable manner on the housing for locking with a mating element, at least one safety element which is provided for securing the pawl in the locked state, and can be moved relative to the pawl for unlocking the device, and a query device which queries the locked state of the locking device, and has a transducer and a sensor, the query device being designed in a contactless manner, and the transducer and the sensor interacting with each other due to the relative positioning and/or movement thereof. Moreover, at a different point a second mechanical query device is provided with a further transducer and sensor.

SUMMARY OF THE INVENTION

The object of the invention is to improve a locking device of the aforementioned type.

This object is achieved according to the invention by a locking device having a housing, a pawl mounted in a movable manner on the housing for locking with a mating element, at least one safety element for securing the pawl in the locked state, and can be moved relative to the pawl for unlocking the locking device and a query device. The query device queries the locked state of the locking device and has at least one transducer and at least one sensor. The query device is designed in a contactless manner and the transducer and the sensor interact with each other due to the relative positioning and/or movement thereof.

Complex mechanical query elements are dispensed with as the query device is designed in a contactless manner, the transducer and the sensor interacting with each other, i.e. for example optically or magnetically, due to the relative positioning and/or movement thereof. Additionally, in a relatively simple manner a plurality of transducers may cooperate with the same sensor, as the power and characteristics of the transducers—which are different for accurate evaluation—are overlaid. A simple electronic evaluation unit is thus preferably able to differentiate between three states, namely the locked state, the unlocked state and a misuse case, for example when the locking device is only apparently locked without a mating element.

The transducers may be active elements which, for example, produce a field which as a result of a movement of the transducer acts as a signal at the location of the sensor. The transducers may, however, also be passive elements which produce a signal by interfering with a field (for example produced by a different transducer) at the location of the sensor, for example weakening or deflecting the field.

Preferably, the transducers are provided on the safety elements and the sensor is provided on the housing, the reverse arrangement also being possible. Variable spacings of the transducers, for example from a pivot axis of the safety elements and thus from the sensor, or transducers of different power produce the different powers of the transducers at the location of the sensor. In magnetic transducers, different orientations are also possible. Thus an approximately tangential orientation of the transducer relative to the pivot axis of the safety elements may produce a zero crossing of the output voltage of the sensor. If a clamping element is provided for the normal case and a catch element is provided for the crash case, as safety elements which are preferably coupled for take-up, only one of the two needs to have a transmitter or a sensor.

The locking device according to the invention may be used at different points of a vehicle seat, for example for attaching the entire vehicle seat to the floor or as a backrest lock for fastening the backrest to the vehicle structure. Of the locking device and the mating element, one is fastened to the structure of the seat part (in the case of attachment to the floor) or to the backrest (in the case of attachment to the backrest) and the other to the vehicle structure. The locking device may also be used elsewhere in the vehicle.

Particularly preferably, the locking device is provided in combination with a sensing of the backrest inclination, i.e. a backrest inclination query device, and a common evaluation unit, so that malfunctions may be reliably identified and displayed.

The invention is explained hereinafter in more detail with reference to an exemplary embodiment as well as various specific embodiments thereof shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a section through the exemplary embodiment in the locked state with the mating element indicated;

FIG. 2 is a section through the exemplary embodiment in the unlocked state;

FIG. 3 is a section along the line III-III in FIG. 1;

FIG. 4 is a schematic representation of a vehicle seat;

FIG. 5 is an exploded view of the query device;

FIG. 6 is the course of the output voltage of the sensor depending on the angular positions of the safety elements;

DESCRIPTION OF THE PREFERRED EMBODIMENTS

Figure 7:
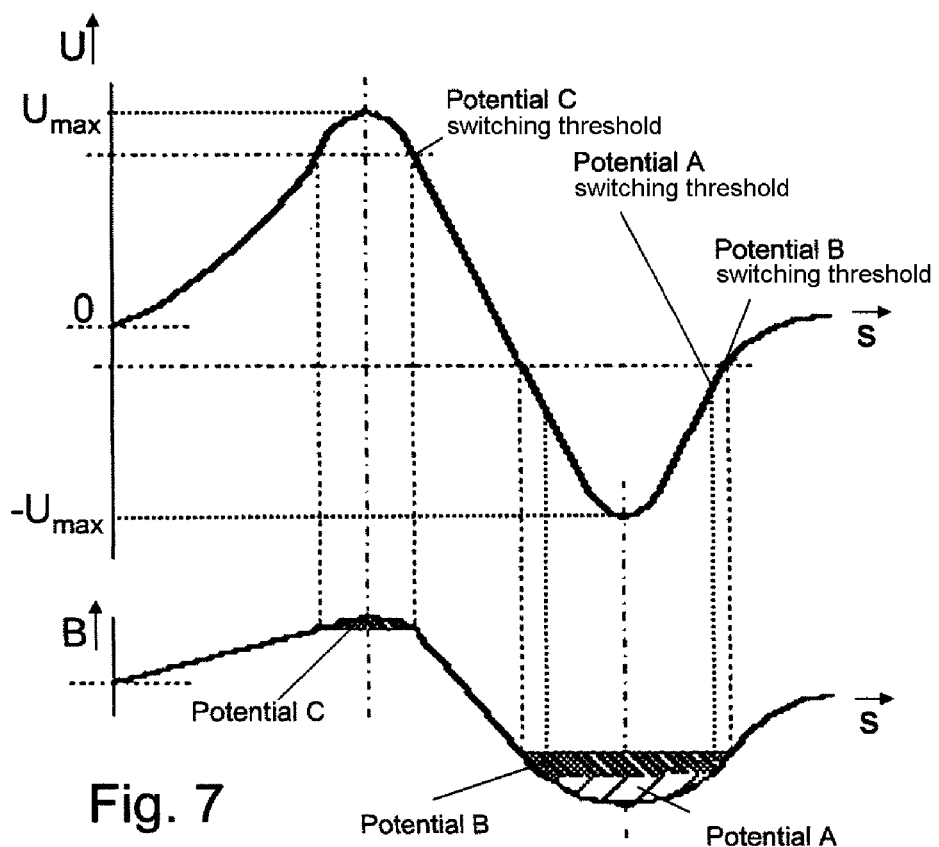
FIG. 7 is a section through the course of the output voltage of the sensor over a path length and/or an angular position of the safety elements.

A locking device 1 is provided in a motor vehicle for connecting a backrest 2 of a vehicle seat 3 to the vehicle structure. The locking device 1 (FIG. 1 and FIG. 2) has a half-open housing 5, comprising an approximately planar bottom surface and raised edges. The bottom surface is generally arranged in a plane defined by the direction of travel of the motor vehicle and by the vertical, and which defines the directional information used hereinafter. The housing 5 is substantially closed by a cover 6, which bears against the housing 5 approximately parallel to the bottom surface, and is connected thereto (FIG. 3). The housing 5 and/or the cover may, for example, be configured from metal or plastics, optionally with metal insert parts. In a modified embodiment, a part of the structure of the vehicle seat 3 or the vehicle structure forms the cover 6.

In the housing 5 and in the cover 6, a receiver 7 is formed which opens in the direction of a mating element B, in order to receive said mating element for locking. Thus, of the locking device 1 and the mating element B, one is fastened to the structure of the backrest 2 and the other to the vehicle structure. The mating element B may, for example, be a pin or a clip. The portion of the mating element B to be received by the receiver 7 generally extends horizontally. The direction in which the mating element B is received by the receiver 7 is denoted as the direction of insertion. The dimensions of the receiver 7 perpendicular to the direction of insertion (and in the plane of the bottom surface of the housing 5) are preferably greater for compensating play than the corresponding diameter of the mating element B.

A pawl 11 is pivotably mounted on a first bearing pin 13, which in turn is fastened to the housing 5 (and to the cover 6) and protrudes perpendicularly from the bottom surface thereof, i.e. extends horizontally. The first bearing pin 13 is preferably of hollow configuration in order to receive a fastening means, for example a screw, by means of which the locking device 1 is fastened to the associated structure during assembly. The pawl 11 has a hook aperture 15 for cooperating with the mating element B.

In the closed position of the pawl 11 the hook aperture 15 traverses the receiver 7 approximately vertically and is opened laterally relative to the direction of insertion. The dimensions of the hook aperture 15 oriented in the direction of insertion are slightly greater than the diameter of the mating element B, whereby the mating element B in the locked state of the locking device 1 does not bear against the edge of the hook aperture 15 which is positioned further inwards in the direction of insertion, but against the bottom of the receiver 7 on the housing 5. In the open position of the pawl 11 the hook aperture 15 is opened obliquely to the direction of insertion and traverses the receiver 7 obliquely. The hook aperture 15 is thus ready for introducing the mating element B. The pawl 11 may be pretensioned toward the open position.

The pawl 11 has a functional surface 21 which in the locked position faces approximately in the direction of a second bearing pin 23, which is arranged parallel to the first bearing pin 13 and in the same manner is fastened to the housing 5 (and to the cover 6). The functional surface 21 is curved, for example, in a circular arc-shape and of concave configuration, but may also be planar. On the second bearing pin 23 a clamping element 25 is pivotably mounted, which is pretensioned toward the pawl 11, in particular by a spring. In the locked state, in the normal case the clamping element 25, as a safety element, exerts a closing moment on the pawl 11 by means of a clamping surface 29 curved eccentrically to the second bearing pin 23, which is in non-self-locking contact with the functional surface 21. As a result, the pawl 11 is without clearance in this closed position. The clamping surface 29 is, for example, curved in a circular arc-shape and of convex configuration.

A catch element 31 is axially arranged (relative to the second bearing pin 23) adjacent to the clamping element 25 on the side remote from the housing 5 and is also mounted pivotably on the second bearing pin 23, i.e. aligned with the clamping element 25 about a common pivot axis. The catch element 31 has a catch surface 33 which is located in the vicinity of the clamping surface 29, but in the locked state spaced apart from the functional surface 21. The catch surface 33 is, for example, curved in a circular arc-shape and of convex configuration, but may also be planar. The catch element 31 may be mounted in its center of gravity. The catch element 31 and the clamping element 25 are coupled with free travel for take-up, for example by means of a slot-pin guide or an axially protruding drive element. In the event of a crash, if the pawl 11 were to perform an opening moment and slightly push away the clamping element 25, the catch surface 33 would come into self-locking contact with the functional surface 21, without an opening moment being able to be transmitted. Thus the catch element 31 serves for supporting the pawl 11 and, as a further safety element, prevents an opening thereof.

In the locked state of the locking device 1 (FIG. 1) the mating element B is located in the receiver 7 and in the hook aperture 15 of the closed pawl 11, the clamping element 25 secures the pawl 11 and the catch element 31 is slightly spaced apart from the functional surface 21. In order to unlock the locking device 1, the safety elements 25 and 31 have to be pivoted away from the pawl 11. If the catch element 31 is pivoted, the catch surface 33 moves away from the functional surface 21. The pivoting catch element 31 drives the clamping element 25 so that the pawl 11 is no longer secured. Driven by one of the two safety elements or by separate pretensioning, the pawl 11 opens. Due to the pivoting movement of the pawl 11, the hook aperture 15 is pulled back from the receiver 7 and releases the mating element B, which moves away relative to the locking device 1 counter to the direction of insertion. Preferably in the unlocked state of the locking device 1, the pawl 11 and the catch element 31 bear against one another for mutual support at a point which is respectively different from the functional surface 21 and the catch surface 33, so that the hook aperture 15 remains ready for receiving.

If in this unlocked state (FIG. 2) the mating element B again enters the receiver 7 and comes to bear against the edge of the hook aperture 15, in the present case on the functional surface 21 thereof, the mating element B presses the pawl 11 into its closed position. The safety elements 25 and 31 move (as a result of being inherently pretensioned or driven by the other safety element) along the functional surface 21, into their end positions, whereby the two safety elements 25 and 31 again secure the pawl 11. The locking device 1 has then been automatically locked.

There are various possibilities for the sequence and time delay of the pivoting movements of the safety elements 25 and 31. It is preferable, when the mating element B has forced the pawl 11 into its closed position, that initially the catch element 31 has reached its end position defined by a stop, in which the pawl 11 is locked in a crash-safe manner. The total load which may be produced in use is supported by the pawl 11 and the catch element 31. After a time delay, the clamping element 25 is engaged, which by means of its clamping surface 29 the pawl 11 without clearance (and thus the locking device 1) (relative to the mating element B and the structure connected thereto). Rattling noise is thus eliminated.

In order to query the locked state of the locking device 1, the locking device 1 has a query device 40 (FIG. 5). The query device 40 comprises a first transducer 41 which is arranged on the clamping element 25, a second transducer 42, which is arranged on the catch element 31, and at least one sensor 43 which is arranged on the housing 5. The query device 40 is designed in a contactless manner, i.e. the transducers 41 and 42 and the sensor 43 are not in contact, but interact with each other due to the relative positioning thereof (optionally including the orientation) and/or their relative movement, in particular electromagnetically in the broadest sense.

In the exemplary embodiment, a magnetic query device 40 is provided in which the transducers 41 and 42 are magnets and the sensor 43 is a Hall sensor. The relative movement of the magnets to the Hall sensor produces a signal in the Hall sensor. The transducers 41 and 42 are arranged—relative to the second bearing pin 23—opposite the clamping surface 29 and the catch surface 33, and namely tangentially to the second bearing pin 23 and with opposing polarity to one another. The sensor 43 is arranged in the vicinity of the two transducers 41 and 42, in the present case in a support 44 which, for example, consists of plastics.

In the present case, depending on the angular positions $\phi_{25}$ and $\phi_{31}$ of the clamping element 25 and catch element 31 (relative to the second bearing pin 23) the course of the output voltage $V_{43}$ of the sensor 43 is produced as a function dependent on two variables in the form of a potential barrier (FIG. 6). The electronic evaluation unit arranged downstream of the sensor 43 again determines the angular positions $\phi_{25}$ and $\phi_{31}$ from this output voltage $V_{43}$ of the sensor 43.

When pivoting one of these two safety elements 25 or 31 from the maximum open angular position $\phi_{25}$ and $\phi_{31}$ (unlocked state) the output voltage $V_{43}$ of the sensor 43 initially swings in one direction up to a maximum value, then returns with a zero crossing and then again reaches the original level. As the angular positions $\phi_{25}$ and $\phi_{31}$ are defined, the total potential barrier is not utilized.

The two transducers 41 and 42 are arranged at variable distances from the pivot axis of the safety elements and thus at a variable minimum distance relative to the sensor 43, so that the swings of the output voltage $V_{43}$ of the sensor 43 vary in size and permit conclusions to be made about which transducer 41 or 42 has been moved. The operating point A in the potential barrier for the locked state is selected so that it is located in the range of the first swing of the output voltage $V_{43}$ of the sensor 43 below the maximum value thereof.

The clamping element 25 may adopt different end positions relative to the catch element 31—dependent on the tolerances present. In principle, two cases may be differentiated, firstly that the clamping element 25 is engaged and the pawl 11 is set without clearance, and secondly that the clamping element 25 is engaged and the pawl 11 has moved into its absolute end position. The second case means that no mating element B has been received by the hook aperture 15 (a misuse case in the apparently locked state) as then the pawl 11 (in the absence of support) pivots further in the direction of insertion than when a mating element B has been received by the hook aperture 15 and limits the pivoting movement of the pawl 11 (locked state). Due to the end position of the pawl 11 which is different relative thereto, the pivoting of the clamping element 25, which is adjusted without any play, and thus of the first transducer 41 in the different angular positions $\phi_{25}$ also ceases. This leads to a different output voltage $V_{43}$ of the sensor 43, for example, below a threshold value—when overlaid with the magnetic field of the second transducer 42. Thus the misuse case may be identified.

Several modifications are possible to the exemplary embodiment. Thus, instead of the opposing orientation and tangential arrangement of the transducers 41 and 42, which are of the same configuration, on the safety elements 25 and 31, also any other orientations, arrangements or power (i.e. magnetic flux densities) are possible. The effect that the two safety elements are coupled for take-up may also be utilized. Only one of the two safety elements 25 or 31, preferably the clamping element 25, thus carries a transducer, in order to identify, apart from the unlocked state and the locked state, the misuse case in the apparently locked state.

The mutual interference of the magnetic fields of the two transducers 41 and 42 (arranged with opposing polarity or the same polarity) may, for example, also be developed in that instead of the one transducer a (soft) iron piece is provided, for example a lug on the clamping element 25 which weakens the magnetic field—produced by the transducer on the catch element 31—to different degrees at the location of the sensor 43, depending on the end position of the clamping element 25. Thus the iron piece in the misuse case could deflect the magnetic field line such that the sensor 43 would be penetrated less by magnetic field lines, and thus the output voltage $V_{43}$ of the sensor 43 would fall below a threshold value.

For an optical query device 40, for example, the transducers 41 and 42 may be mirrors, which are illuminated by a light beam and the sensor 43 a photodiode. The relative positioning, in particular the angle at which the reflective and absorbing surfaces are oriented, determine whether the photodiode contains a signal. A capacitive query device 40 is also possible, in which for example the transducers 41 and 42 have different dielectric constants.

According to a development, to increase the safety and protection from malfunction, the components which sense the state of the locking device 5, i.e. the query device 40, as are described in more detail with reference to FIGS. 1 to 8, are coupled to at least one, preferably just one, backrest inclination sensor 50, i.e. a backrest inclination query device, i.e. both the state of the locking device 5 and the backrest inclination are sensed. For the control display (not shown) which, for example, may be integrated in the dashboard, said control display is switched on when unlocking the locking device 5. When the backrest is folded up subsequently, the control display goes out again, as it may be assumed that the folded position has been caused by the occupant and is desired.

The invention is supplemented hereinafter in that, in addition to a query device 40 disclosed above, for determining the locked state of the locking device 1 a backrest inclination query device comprising at least one backrest inclination sensor 50 is also provided, which may be arranged both inside the housing 5 of the locking device 1 and also at a different point within the backrest in the vicinity of the backrest pivot point.

As it is the more advantageous embodiment, a backrest inclination sensor 50 which is integrated directly in the housing 5 for the locking device 1 is exclusively described below, three different embodiments of separately configured backrest inclination sensors being shown in FIGS. 9, 11 and 12 by way of example. For easier understanding, the same reference numerals have been used in the drawings for elements which are the same and/or act in the same way.

The "locked state sensor", "backrest inclination sensor" and "signal combining and evaluation" components are combined in the embodiment disclosed with reference to FIGS. 1 to 6 in a single sensor unit (with a transmitter and receiver) and an evaluation unit integrated in the sensor unit, a plurality of transmitters (first and second transducers 41 and/or 42 for the locked state and a transducer for the backrest inclination (not shown), being able to be provided within the sensor unit in order to determine the different states, and the evaluation unit preparing the signals of the receiver directly so that information may be forwarded to the occupant, for example by means of a control display and/or a signal tone. Moreover, the display may also be implemented "in situ", for example by means of an LED element which is attached to the housing 5 and easily visible from the outside, as indicated by the large black dot, shown bottom right in FIGS. 9, 11 and 12.

Such a device comprising the locking device 1 and backrest inclination sensor unit comprises the following three elements: sensing the locking device, sensing the backrest inclination and combining the information in the evaluation unit.

In this connection, during operation and in a first step the sensor unit, in the present case a Hall sensor which moves relative to a magnetic field, determines the position of the catch element 31, the catch element 31 being provided with the second transducer 42 (see FIG. 1), which is positioned relative to the receiver (sensor 43). In this connection, the second transducer 42 in the receiver produces a potential A in the locked position (see schematic representation of FIG. 7) i.e. the potential A corresponds to the locked position. If—according to an optional embodiment—the clamping element 25 is queried, by a defined alteration of the potential from potential A to potential B, the evaluation unit may determine that faulty locking is present (for example locking without the pin and/or mating element B). This query of the clamping element 25 may be carried out by an additional transducer (first transducer 41 of FIG. 1, which is mounted on the clamping element 25, or by a specific geometric form of the clamping element 25). In both cases, the exciter field of the transducer on the catch element 31 is altered so that the potential B is achieved.

In the second step, the backrest inclination is determined, for which in the present case the same receiver, i.e. the sensor 43 or according to the embodiments of FIGS. 9, 11 and 12 a separate backrest inclination sensor 50 is used, about which brief details will be given at a later point. The third transducer (not shown in the FIGS. 1 to 8) is again a magnet, which influences the receiver such that said receiver switches to a potential C.

As is visible from the view of FIG. 7, the limits of the potentials A, B, C in each case correspond to specific voltages, so that the potentials may be determined by a simple voltage measurement.

The evaluation unit which collects the information, i.e. in the present case the voltage values, when leaving the potential A, i.e. when exceeding the limit voltage thereof (in FIG. 7 denoted by "potential A switching value"), switches on the display in order to display the unlocked state. The display is switched off again in a correct sequence in which the potential C is reached at the end, i.e. when exceeding the limit voltage thereof (denoted in FIG. 7 by "potential C switching value"). In the case of a malfunction, i.e. when the potential C is not reached, the display remains switched on as a warning.

Figure 8:
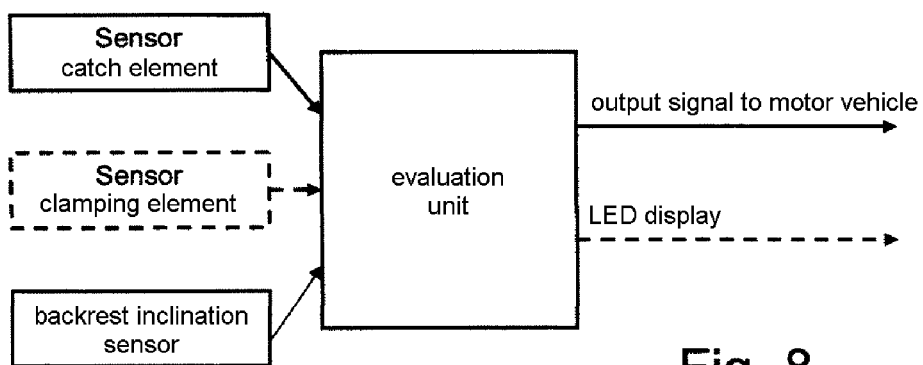
FIG. 8 is a block diagram for illustrating possible input parameters in the electronic evaluation unit as well as the outputs of the electronic evaluation unit.

The function of the evaluation unit is shown schematically in FIG. 8. In this case, the data of the catch element sensor (and optionally the clamping element sensor) as well as the backrest inclination sensor in the evaluation unit, usually a specific electronic evaluation unit, are evaluated and the result forwarded as an output signal to a motor vehicle control unit, which activates a display in the dashboard and/or are optionally forwarded directly to a visual display such as an LED display in the region of the trunk. In this case, the following states are possible:
    backrest upright, locked (potential A);
    backrest upright, not locked;
    backrest tilted (potential C);
    and optionally (if the clamping element sensor is present):
    backrest upright, incorrectly locked (potential B).

Naturally, where there are corresponding requirements for the system and for the accuracy of the detection, an electronic phase-angle sensor may also be provided for determining the backrest inclination.

By way of example, possible embodiments of the backrest inclination sensor 50 are mentioned briefly below.

Figure 9:
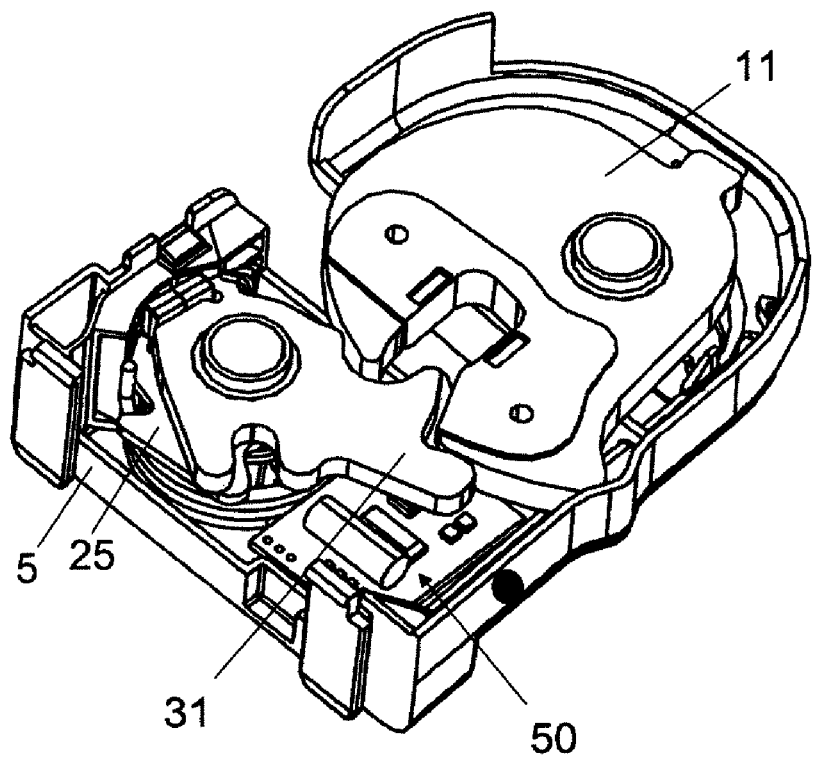
FIG. 9 is a perspective view of a locking device comprising a ball for sensing the backrest inclination in the locked state.
Figure 10:
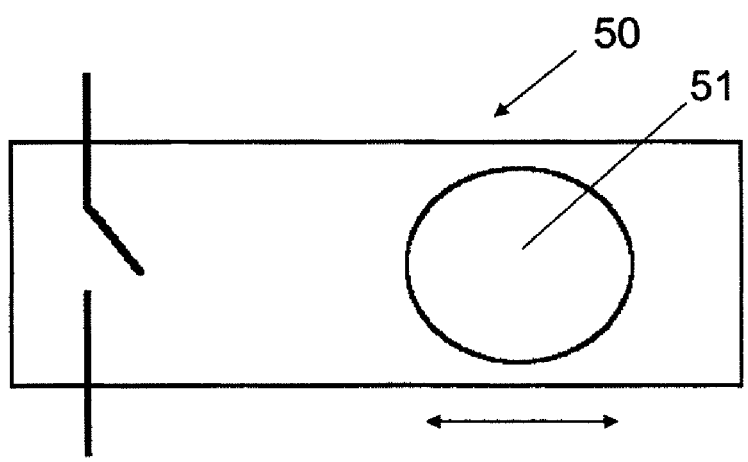
FIG. 10 is a schematic representation of the sensor arrangement of the locking device of FIG. 9.

The backrest inclination sensor 50 according to the embodiment of FIGS. 9 and 10 is formed by a ball in combination with a switch, the ball altering its position with an alteration of the backrest inclination. If the backrest is pivoted forward, in the present case it comes to bear against a switch and closes a circuit. If the backrest is pivoted back again, the switch is automatically opened again as a result of the ball rolling back. Thus the ball acts as a third transducer 51.

Figure 11:
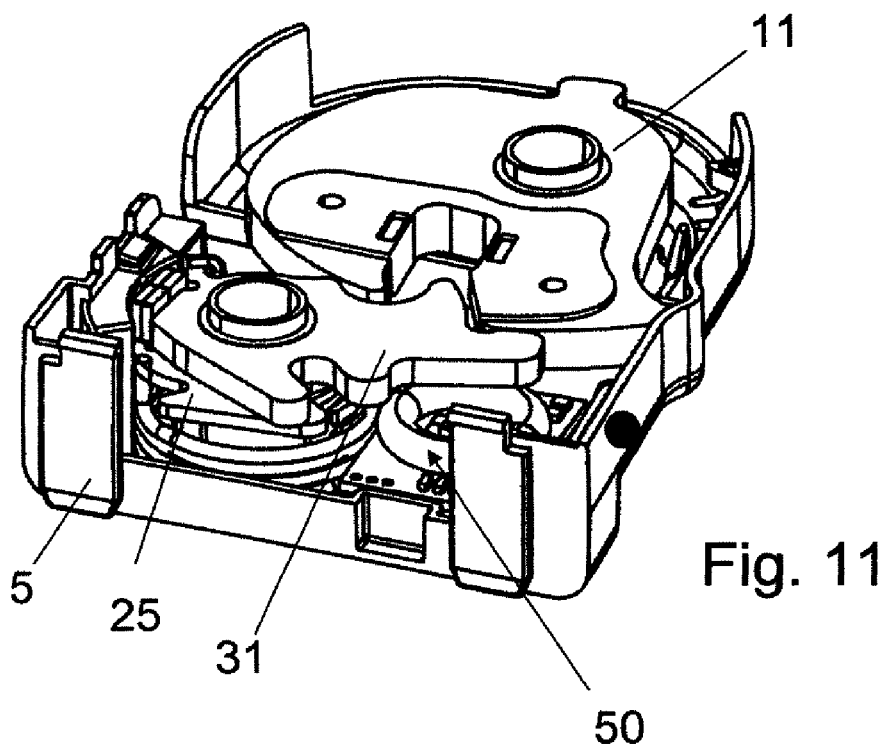
FIG. 11 is a perspective representation of a locking device comprising a magnetizable liquid for sensing the backrest inclination in the locked state.

According to the embodiment shown in FIG. 11, a magnetizable liquid is provided which, in the case of an alteration to the position of the backrest, results in an alteration of a magnetic field as a result of altering the position within a container receiving said liquid. In this case, the magnetizable liquid acts as a third transducer.

Figure 12:
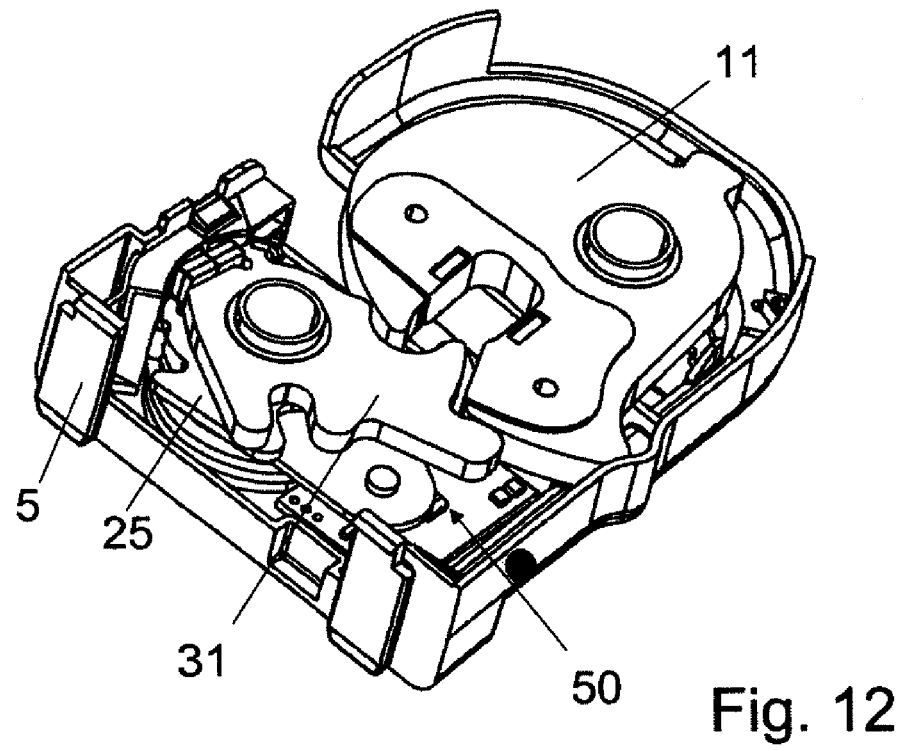
FIG. 12 is a perspective view of a locking device comprising a pendulum-like arrangement for sensing the backrest inclination in the locked state.

A type of pendulum arrangement is provided as the third embodiment in FIG. 12, which permits the sensing of the backrest position. In this connection, in the present case a rotatable disk comprising a magnet as a third transducer cooperates with a sensor, said third transducer always being arranged in the same position as a result of gravity, the relative position of the magnet and sensor being altered by an alteration of the backrest inclination, so that an alteration to the position of the backrest may be determined.

In all cases an alteration to the position of the backrest is forwarded to the evaluation unit, which accordingly evaluates the measured data and, if required, produces a warning to the occupant.

While specific embodiments of the invention have been described in detail to illustrate the application of the principles of the invention, it will be understood that the invention may be embodied otherwise without departing from such principles.

The invention claimed is:

1. A locking device for a vehicle seat, the locking device comprising:
    a housing;
    a pawl mounted in a movable manner on the housing for locking with a mating element;

safety elements for securing the pawl in a locked state, and for moving relative to the pawl for unlocking the locking device, the safety elements including a clamping element exerting a closing moment on the pawl in a normal case, and a catch element supporting the pawl in the event of a crash; and a query device for querying the locked state of the locking device, the query device having a transducer and a sensor, the query device being contactless with the transducer and the sensor interacting with each other due to the relative positioning and/or movement thereof, wherein just one of the safety elements comprises the transducer and another one of the safety elements has a passive element, which interferes with the field of the transducer.

2. The locking device as claimed in claim 1, wherein one of the safety elements is pivotably mounted.

3. The locking device as claimed in claim 2, wherein the transducer is provided on the one of the safety elements and the sensor is provided on the housing.

4. The locking device as claimed in claim 1, wherein a magnet is provided as the transducer and a Hall sensor is provided as the sensor.

5. The locking device as claimed in claim 2, wherein the transducer is oriented with its polarity tangentially to the pivot axis of one of the safety elements.

6. The locking device as claimed in claim 1, wherein the locked state, an unlocked state and a misuse case may be queried by means of the query device.

7. The locking device as claimed in claim 6, wherein in the misuse case the locking device is located in an apparently locked state without the mating element.

8. The locking device as claimed in claim 1, further comprising a backrest inclination query device for determining a backrest inclination, wherein in addition to the at least one transducer of the query device for determining the locked state, at least one transducer of the backrest inclination query device is also provided, the transducers cooperating with at least one sensor.

9. The locking device as claimed in claim 8, wherein a common evaluation unit is provided for all sensors.

10. The locking device as claimed in claim 8, wherein the transducer of the query device and the transducer of the backrest inclination query device cooperate with a common sensor for determining the locked state.

11. The locking device as claimed in claim 8, wherein all transducers and sensors are integrated in the housing for determining the locked state and/or for determining the backrest inclination.

12. A vehicle seat comprising:
a seat part;
a backrest connected to the seat part; and
a locking device comprising:
a housing;
a pawl mounted in a movable manner on the housing for locking with a mating element;
safety elements for securing the pawl in a locked state, and for moving relative to the pawl for unlocking the locking device, the safety elements including a clamping element exerting a closing moment on the pawl in a normal case, and a catch element supporting the pawl in the event of a crash;
a query device for querying the locked state of the locking device, the query device having a transducer and a sensor, the query device being contactless with the transducer and the sensor interacting with each other due to the relative positioning and/or movement thereof; and
a backrest inclination query device for determining a backrest inclination, wherein in addition to the at least one transducer of the query device for determining the locked state, at least one transducer of the backrest inclination query device is also provided, the transducers cooperating with at least one sensor, wherein all transducers and sensors are integrated in the housing for determining said locked state and/or for determining the backrest inclination.

13. The vehicle seat as claimed in claim 12, wherein the safety elements are pivotably mounted.

14. The vehicle seat as claimed in claim 13, wherein the transducer is provided on the safety elements and the sensor is provided on the housing.

15. The vehicle seat as claimed in claim 13, wherein a magnet is provided as the transducer and a Hall sensor is provided as the sensor.

16. The vehicle seat as claimed in claim 13, wherein the transducer is oriented with a polarity extending tangentially to the pivot axis of the safety elements.

17. A locking device for a vehicle seat, the locking device comprising:
a housing;
a pawl mounted in a movable manner on the housing for locking with a mating element;
safety elements for securing the pawl in a locked state, and for moving relative to the pawl for unlocking the locking device, the safety elements including a clamping element exerting a closing moment on the pawl in a normal case, and a catch element supporting the pawl in the event of a crash;
a query device for querying the locked state of the locking device, the query device having a transducer and a sensor, the query device being contactless with the transducer and the sensor interacting with each other due to the relative positioning and/or movement thereof;
a backrest inclination query device for determining a backrest inclination, wherein in addition to the at least one transducer of the query device for determining the locked state, at least one transducer of the backrest inclination query device is also provided, the transducers cooperating with at least one sensor, wherein all transducers and sensors are integrated in the housing for determining the locked state and/or for determining the backrest inclination.

* * * * *